United States Patent [19]
Bryan

[11] Patent Number: 5,892,440
[45] Date of Patent: Apr. 6, 1999

[54] ALARM SIGNIFICANCE MAPPING

[75] Inventor: Robert Emmett Bryan, Bloomfield, Conn.

[73] Assignee: Combustion Engineering Inc., Windsor, Conn.

[21] Appl. No.: 856,149

[22] Filed: May 14, 1997

Related U.S. Application Data

[60] Provisional application No. 60/020,118 Jun. 20, 1996.

[51] Int. Cl.$^6$ .................................................. G08B 25/00
[52] U.S. Cl. ........................ 340/524; 340/506; 340/525; 340/825.36; 340/825.49; 364/146; 345/118
[58] Field of Search ..................................... 340/524, 511, 340/517, 521, 506, 525, 825.06, 825.16, 825.17, 825.36, 825.49; 364/146, 188; 345/117, 118, 348, 173

[56] References Cited

U.S. PATENT DOCUMENTS 5,392,226  2/1995  Hamilton ............................. 364/188 X

FOREIGN PATENT DOCUMENTS

| 0 592 921 | 4/1994 | European Pat. Off. . |
| 42 40 898 | 6/1993 | Germany . |
| 08 234829 | 9/1996 | Japan . |
| 2 181 627 | 3/1987 | United Kingdom . |
| 2 272 326 | 5/1994 | United Kingdom . |
| 2 275 813 | 9/1994 | United Kingdom . |

OTHER PUBLICATIONS

Ridolfo F et al.; "The Nuplex 80+ TM Advanced Control Complex from ABB Combustion Engineering" Nuclear Safety, vol. 34, No. 1, 1993, pp. 64–75.

Minoru Saito; "Controlling Power Plants at the Touch of a Screen: Japan's Fourth Generation" Nuclear Engineering International, vol. 38, No. 464, Mar. 1993, pp. 39–42.

*Primary Examiner*—Jeffery A. Hofsass
*Assistant Examiner*—Daryl C. Pope
*Attorney, Agent, or Firm*—Ronald P. Kananen

[57] ABSTRACT

An alarm significance mapping method assigns the subset of parameters and their alarms considered to be of a safety-critical nature in an industrial control system and displays that subset on an apex screen display and other selected appropriate displays, such as a touch-responsive display in the form of alarm icons for presentation to the system operators. Each alarm icon on the 'apex' display is coupled or concatenated to other displays through a display page hierarchy so that the operator, by selecting a particular alarm icon on the 'apex' screen, can follow the alarm 'thread' through the multi-level display page hierarchy to the ultimate condition or conditions that cause an alarm on the 'apex' screen.

8 Claims, 4 Drawing Sheets

FIG. 2C

ALARM SIGNIFICANCE MAPPING

CROSS REFERENCE TO RELATED APPLICATIONS

The subject matter of the present application is disclosed in applicant's Provisional U.S. Patent Application No. 60/020,118, filed Jun. 20, 1996, from which priority is claimed.

BACKGROUND ART

The present invention relates to the mapping and display of visual alarm indications in complex industrial applications and, more particularly, to the mapping and display of visual alarm indications as part of the control and monitoring of nuclear power plants. Nuclear power plants are designed with multiple levels of instrumented redundancy in order to assure safe and reliable operation and to minimize the probability of a mishap. As part of the design philosophy, numerous parameters are continuously monitored, subjected to evaluation and analysis, and then displayed to the plant operators. Additionally, the measured parameters are subjected to limit testing to determine if a particular parameter is within normal bounds. In those cases where a parameter deviates from an accepted norm, an annunciator or alarm of some type is actuated.

In the earliest nuclear power plant control rooms, numerous instruments were displayed on the walls of the control room and on various consoles and display panels. The presence of an abnormal parameter would trigger one of several types of alarms, including audible alarms, visual alarms, and the like. In these earliest control room designs, the mounting of the instrument displays and their alarm annunciators on the typically large surface areas of the control room wall resulted in alarms that could be conceptually considered as residing in a two-dimensional plane. Alarms related to critical operational parameters could co-exit on the same 'plane' with alarms of a non-critical secondary or tertiary nature. Thus, an alarm related to an excessive and potentially non-safe pressure or temperature in the reactor core could co-exist on the same conceptual plane as an alarm indicating an out-of-limits condition on a tertiary system unrelated to operational safety. While the operators in the control room could easily identify and respond to alarms on a one-at-a-time basis, multiple alarms conditions for both primary safety-critical parameters and secondary or tertiary non-safety critical parameters could overload the ability of an operator or operators to prioritize the order in which alarms must be responded to in order to restore or maintain plant safety. While the safety significance of a visual alarm can be distinguished by providing visual indications of different colors, brightnesses, or 'flash' rates, these additional distinguishing characteristics could also overload the perceptual ability of even the most well-trained operators.

In later control room designs, an effort was made to group safety-related displays and alarms together as a way of affecting the 'topology' of the displayed parameters and alarms to affect the neural representation of the display in the minds of the operators. While this 'grouping' concept provided subliminal assistance to the plant operators, the two-dimensional display concept still presented all the instrumentation and alarms on a common physical plane which could contribute to the difficulty an operator could have in distinguishing alarms of different safety significance.

The problem of the display of data and the related alarms can be traced to the philosophy of assuring that every alarm condition, regardless of criticality, is immediately available to the control room operator. While this philosophy is admirably rooted in a desire to reveal all alarm conditions immediately to the control room operators, it also can contribute to operator overload during multi-alarm conditions.

With the advent of computerized monitoring and control of nuclear power plants, the various parameters and alarms and the safety critical relationship between parameters and alarms can be algorithmically evaluated and presented on video display units within the control room while making all alarms immediately available to the operator regardless of criticality. Thus, a number of operator consoles with CRT displays can present various process parameters and also display alarm conditions. Concurrently, a large-area display (such as a rear-screen projector) in the control room would display all or a sub-portion of the screens of the various CRT'S. Since the amount of information that can be presented on the screen of a CRT is limited, it was not uncommon for information to be provided in a "paged" or "windowed" format. In this last schema, the alarms could be categorized by the supervising computer and displayed on the CRT's and large-area display; the operator could then page through a number of CRT menu screens to locate the source problem.

It is possible to conceptualize all the alarm conditions in a nuclear power plant as being required information in a hierarchy of display pages. Each alarm object has differing safety significance weights or factors depending upon its assignment to a display(s). Some alarm conditions have no affect, directly or indirectly, on operational safety while other alarms have a first-order relationship. Depending upon its display page context, an alarm may have a first-order relationship on one display and a supporting relationship on another display. Those alarms conditions that have safety significance can be thought of as occupying the 'apex' of the display page hierarchy. These alarm objects are connected by relational threads to one or more display pages in the other levels of the display page hierarchy.

DISCLOSURE OF INVENTION

The present invention provides alarm significance mapping by selecting that subset of parameters and their alarms considered to be of a safety-critical nature and displaying that subset on a display, such as a touch-responsive display, as alarm icons for presentation to the control room operators as the integrated plant status overview (IPSO) screen. Those parameters and their alarms not considered to be of an immediate safety-critical nature are intentionally not displayed on the IPSO screen but are nonetheless displayed on other screens and are accessible from the CRT display page directory menu.

Each alarm icon on the IPSO display is coupled or concatenated to other displays so that the operator, by selecting a particular alarm icon on the IPSO or display page directory menu screen, can follow the alarm 'thread' through the multi-level display hierarchy to the display page designed to indicate the ultimate condition or conditions that triggered an alarm on the IPSO screen and display page directory menu.

The present invention advantageously provides an alarm significance mapping method of alarm display in which only those alarm conditions deemed to have a pre-determined critical impact on plant operation are displayed on icon-like symbols on display pages in a safety-critical display page hierarchy so that non-critical alarms which are also immediately presented in other display page hierarchies do not compromise operator efficiency in the face of a multi-alarm condition. Each displayed alarm icon can be used by the operator to follow a relational thread through the display page hierarchy to the cause or causes that initiated the alarm condition on the IPSO screen and display page directory menu.

Other objects and further scope of applicability of the present invention will become apparent from the detailed description to follow, taken in conjunction with the accompanying drawings, in which like parts are designated by like reference characters.

BRIEF DESCRIPTION OF THE DRAWINGS

The present invention is described below, by way of example, with reference to the accompanying drawings, wherein.

BEST MODE FOR CARRYING OUT THE INVENTION

Figure 1:
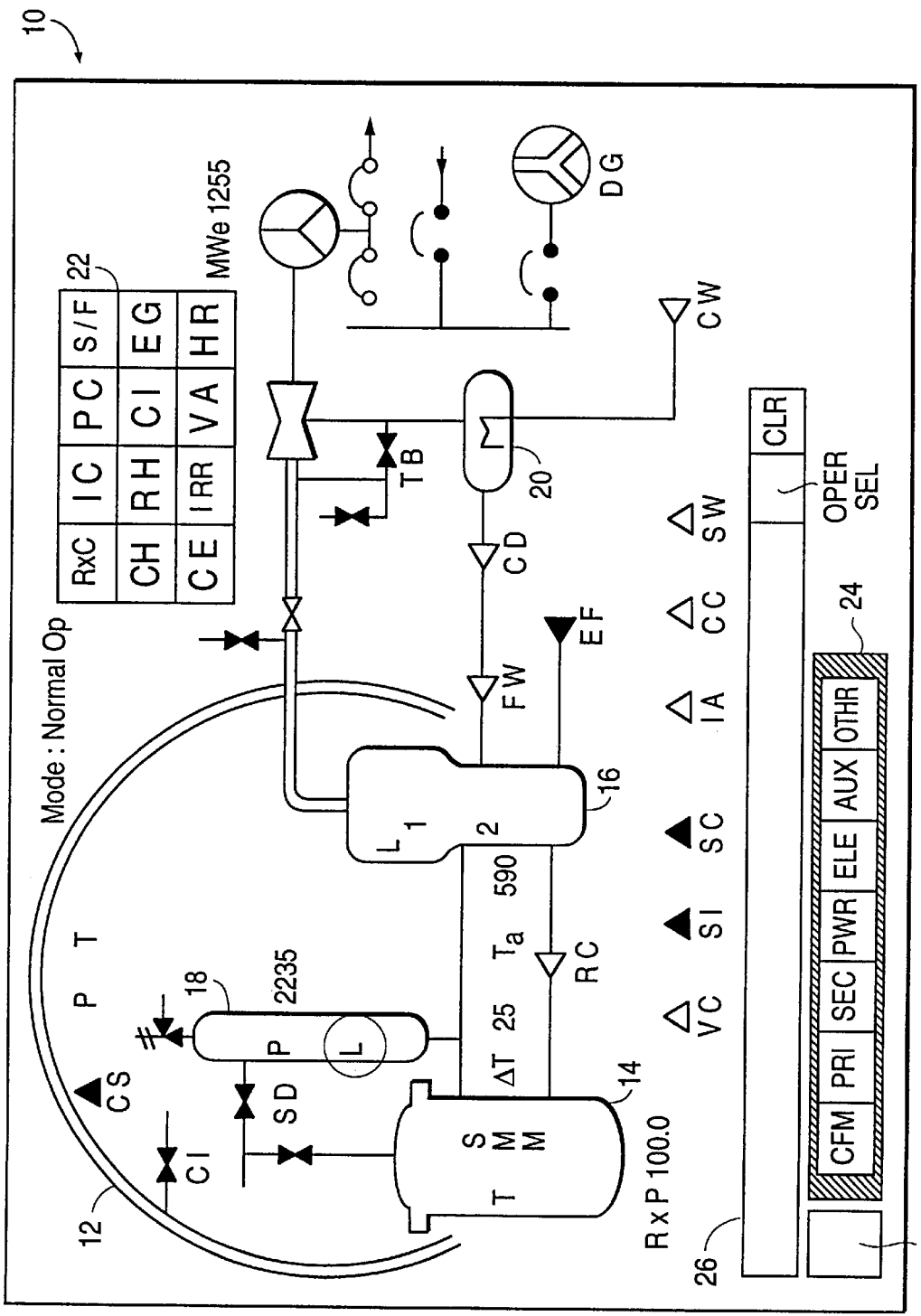
FIG. 1 is a plan view of an IPSO screen of safety-critical alarms in accordance with the present invention.

An alarm significance mapping system in accordance with the present invention is shown in FIG. 1 which illustrates a preferred IPSO display screen 10. The IPSO screen 10 is presented on a touch-responsive display that typically includes spaced orthogonal light beams that, when interrupted by the touch of an operator, identify the touched area of the display to the controlling software. The display screen and all the related hardware and software are part of the Nuplex80+ plant control system designed by ABB Combustion Engineering of Windsor, Conn. The IPSO screen 10 includes a symbolic graphic overview representation of the plant processes including the containment vessel 12, the reactor 14, the steam generator 16, the pressurizer 18, the circulating water heat exchanger 20, and related piping, pumps, and valves. The proper operation of these systems is necessary to assure safe plant operation. A critical safety function alarm-acknowledgement matrix 22 is located to the right of the containment vessel 12, and a bar menu 24 is located at the lower portion of the IPSO screen 10 and all other CRT display screens in the plant display page hierarchy. The configuration shown in the IPSO screen 10 of FIG. 1 is merely exemplary. A number of isolateral triangular 'icons' are shown with associated mnemonics representing various sub-systems. These sub-systems are required to maintain or restore critical safety function parameters to the required values. Process measurements are represented by a letter symbol, i.e., P for pressure and T for temperature. The process variables are critical function parameters that must be maintained at the proper value to assure plant safety is maintained.

Within the upper portion of the containment vessel 12, the letters P and T represent containment vessel pressure and temperature, respectively, the mnemonic CS and the associated triangle symbol represent the containment spray system, the mnemonic CI and the associated valve symbol represent the containment isolation system, the mnemonic SD and the associated valve symbol represent the safety depressurization system, the letters P and L within the pressurizer 18 represent pressure within the pressurizer and the fluid level therein, respectively.

Within the reactor vessel 14, the symbol T represents temperature and the three vertical letters SMM represent the sub-cooled margin monitor, the letters RC and the associated left-pointing flow triangle symbol represent reactor cooling, the letter L within the steam generator 16 represents fluid level, the letters FW and the left-pointing flow triangle symbol represent feedwater, the letters CD and the associated left-pointing triangle represent condensate, the letters EF and the associated left-pointing triangle represent emergency feedwater, the letters CW and the associated left-pointing triangle represent cooling water, the letters TB and the associated valve symbols represent turbine bypass, and the letters DG and the associated symbol represent standby diesel generator status.

The row of triangular icons and associated two-letter symbols VC, SI, SC, IA, CC, and SW located beneath the steam generator 16 represent volume control, safety injection, shut-down cooling, instrument air, component cooling, and service water, respectively.

The various alarmable parameters and systems of the IPSO screen 10 of FIG. 1 represent that subset of the universe of alarm objects of the nuclear power plant that can be considered of a safety critical nature. Thus, the IPSO screen 10 is a map of representations for alarms considered to have significant effect on plant safety.

The display page directory menu 24 includes touch-responsive areas CFM, PRI, SEC, PWR, ELE, AUX, and OTHR which represent the critical function monitor, primary, secondary, power, electric, auxiliary, and other sectors of the power plant. Display pages unique to these directories are accessed here. Alarm conditions occurring in each directory are displayed on its touch target icon. A message window 26 is located above the bar menu 24 for presenting relevant messages to the operator.

Figure 2A:
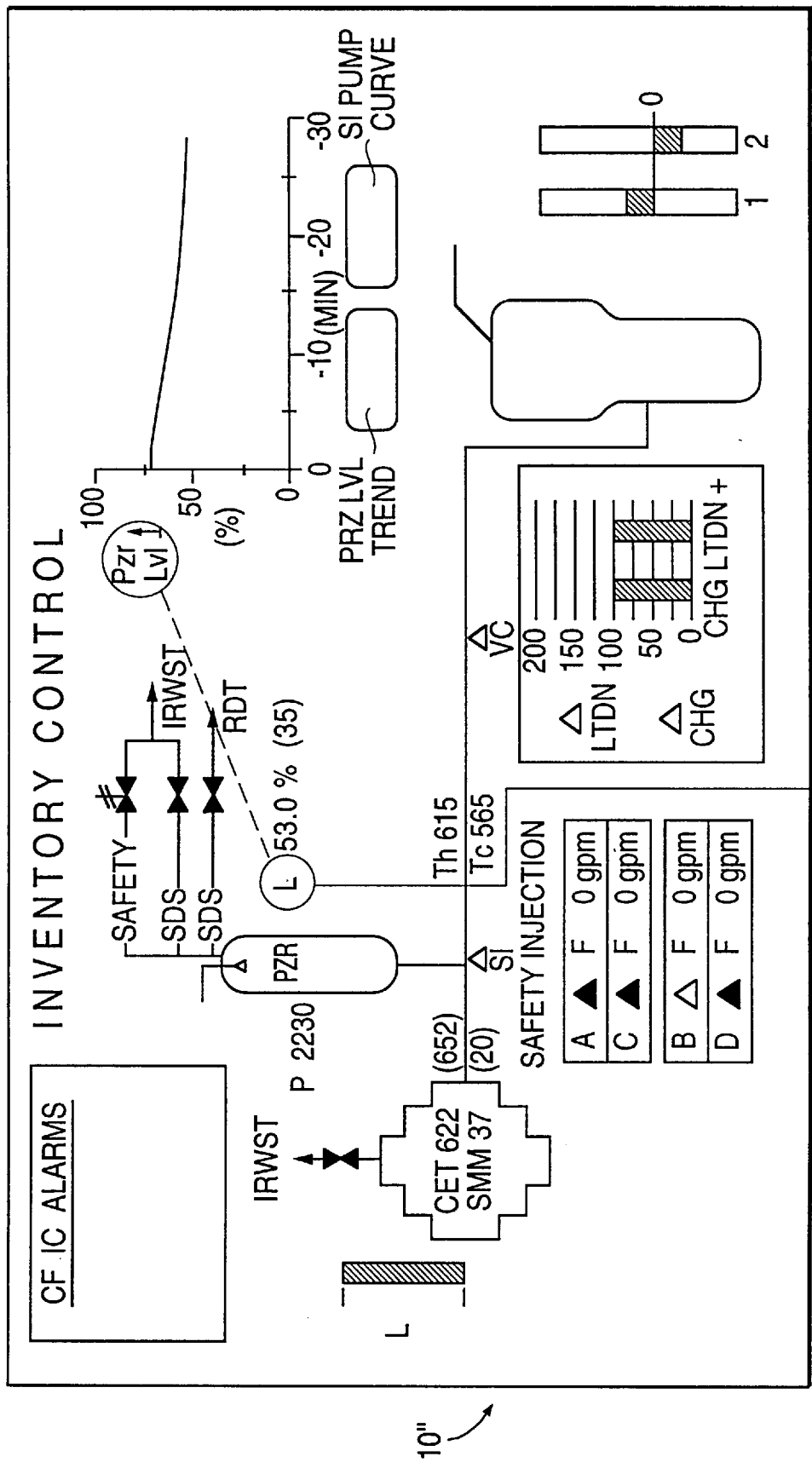
FIG. 2 is a conceptual view of an alarm thread or pathway through the hierarchy of display pages for one of the alarm icons of the IPSO screen of FIG. 1.
Figure 2B:
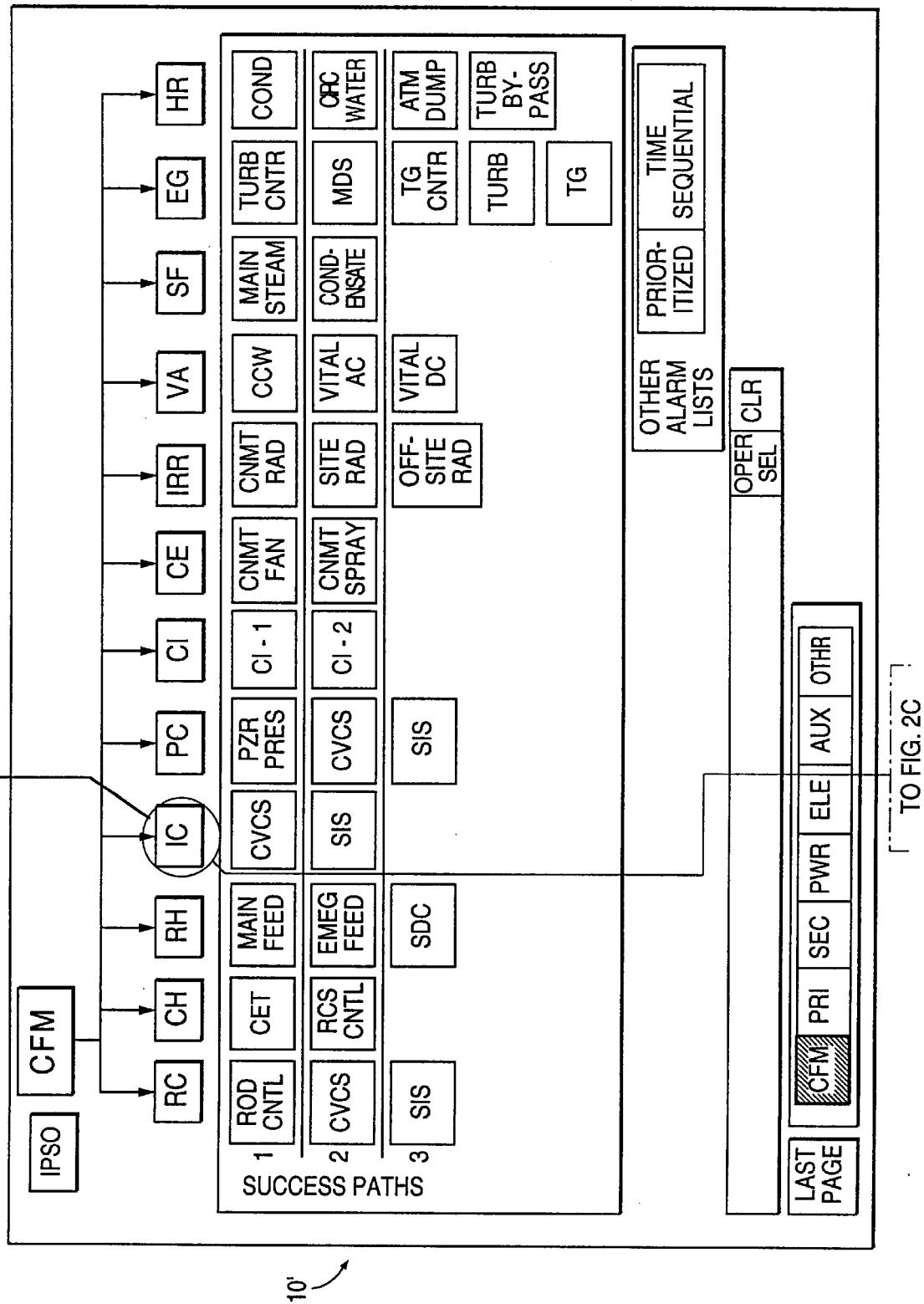
Figure 2C:
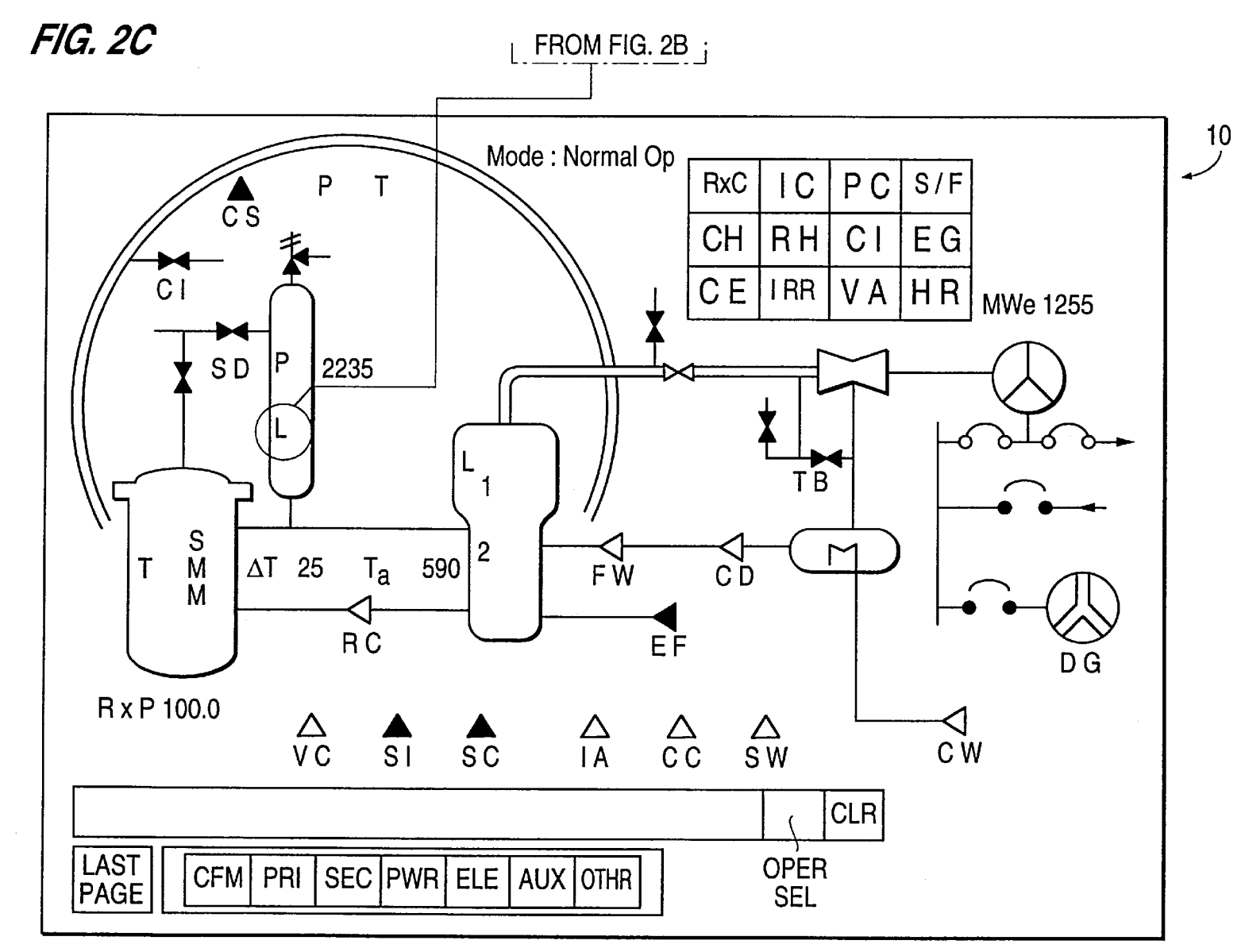

The underlying concept of alarm significance mapping in accordance with the present invention is best illustrated in FIG. 2. As shown, the IPSO screen of FIG. 1 represents a map of all significant alarms within the array of alarms. If, for example, an alarm condition develops which causes the level of water in the pressurizer 18 to go above or below its acceptable limits, an alarm condition within the alarm matrix will cause the single letter L indicator within the symbolically illustrated pressurizer 18 to change color or to blink on and off at a selected rate. Additionally, an audio annunciator will sound concurrently to audibly alert the control room operators of an alarm condition. Once the operator is alerted, the IPSO screen 10 is visually scanned for the alarm condition. The operator then can merely touch the alarm icon to acknowledge the alarm and select an alarm display page icon to go directly to a second screen 10' and thence to a third screen 10" to locate the display that has the necessary information to support successful correction of the alarm condition. The path followed from the IPSO screen 10 to the screen 10" thus represents the mapping of the alarm to its most significant display page that has that alarm. The alarm exists on several other necessary but less informative display pages. As can be appreciated, the particular screens 10' and 10" are representative only and a multiplicity of screens and alarm mappings are possible.

While the safety-critical alarm objects are displayed on the IPSO screen 10, the various icons and touch areas of the display screens in the various plant sector display page hierarchies can be used to access all of the alarm objects in the universe of alarm objects of the system.

Industrial Applicability

The present invention is best suited for use in industrial process control systems, including those systems used in the control of nuclear power plants and preferably implemented in the Nuplex80+ system by ABB Combustion Engineering, Inc. of Windsor, Conn.

As will be apparent to those skilled in the art, various changes and modifications may be made to the illustrated alarm significance mapping of the present invention without departing from the spirit and scope of the invention as determined in the appended claims and their legal equivalent.

I claim:

1. A significant-alarm display system for an industrial control system having a plurality of monitored alarm objects defined by parameters, components, and subsystems and alarm conditions associated therewith, a subset of the monitored alarm objects having a predetermined criticality to successful operation of the industrial control system and having a video display system for displaying information on a display surface, the video display system responsive to actuation of a selected portion of the display surface by touching, the system comprising:

an apex display screen presenting an iconic representation of each monitored object of the subset of monitored objects having a predetermined criticality to successful operation of the industrial control system, and at least one additional screen accessed by actuation of a selected iconic representation of the apex screen, a touch of an iconic representation of an alarm condition relating to a monitored objecting causing a transfer by appropriate navigation aids to a second screen to locate a root cause of the alarm on the most desirable display page.

2. A display system as set forth in claim 1, wherein said apex display screen is a touch-responsive display.

3. A display system as set forth in claim 1, wherein said iconic representation of each monitored object of the subset of monitored objects includes a containment vessel, a reactor, a steam generator, a pressurizer, a cooling water heat exchanger, and related plumbing.

4. A display system as set forth in claim 3, wherein said apex display screen includes alarm-acknowledgement (a) matrix, (b) parameter icons, (c) system icons, and (d) display page directory icons.

5. A method far displaying significant alarms in an industrial control system having a plurality of monitored alarm objects defined by parameters, components, and subsystems and alarm conditions associated therewith, a subset of the monitored alarm objects having a predetermined criticality to successful operation of the industrial control system and a video display system for displaying information on a display surface, the video display system responsive to actuation of a selected portion of the display surface by touching, the method comprising the steps of:

displaying, on a video display surface, an iconic representation of each monitored alarm object of the subset of monitored alarm objects having a predetermined criticality to successful operation of the industrial control system, and providing access to at least one additional screen by appropriate navigation aids by actuation of a selected iconic representation on the first-mentioned display to cause a transfer to at least one additional screen to locate a root cause of an alarm condition.

6. A display method as set forth in claim 5, wherein said apex display screen is a touch-responsive display.

7. A display system as set forth in claim 5, wherein said iconic representation of each monitored object of the subset of monitored objects includes a containment vessel, a reactor, a steam generator, a pressurizer, a cooling water heat exchanger, and related plumbing.

8. A display system as set forth in claim 7, wherein said apex display screen includes an alarm-acknowledgement (a) matrix, (b) parameter icon, (c) system icons, and (d) display page directory icons.

* * * * *